Nov. 15, 1927.  
E. FREIVOGEL  
1,649,679  
COMBINED TIRE RACK AND WORKBENCH  
Filed Jan. 7, 1927  
2 Sheets-Sheet 1

Inventor  
*Ernest Freivogel*

By *Chamberlain & Newman*  
Attorneys

Nov. 15, 1927.  1,649,679
E. FREIVOGEL
COMBINED TIRE RACK AND WORKBENCH
Filed Jan. 7, 1927   2 Sheets-Sheet 2
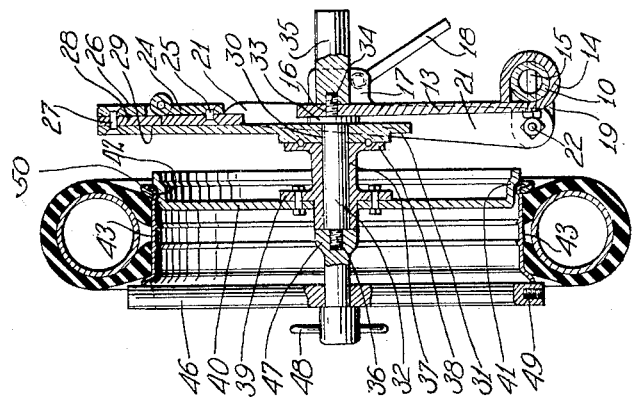
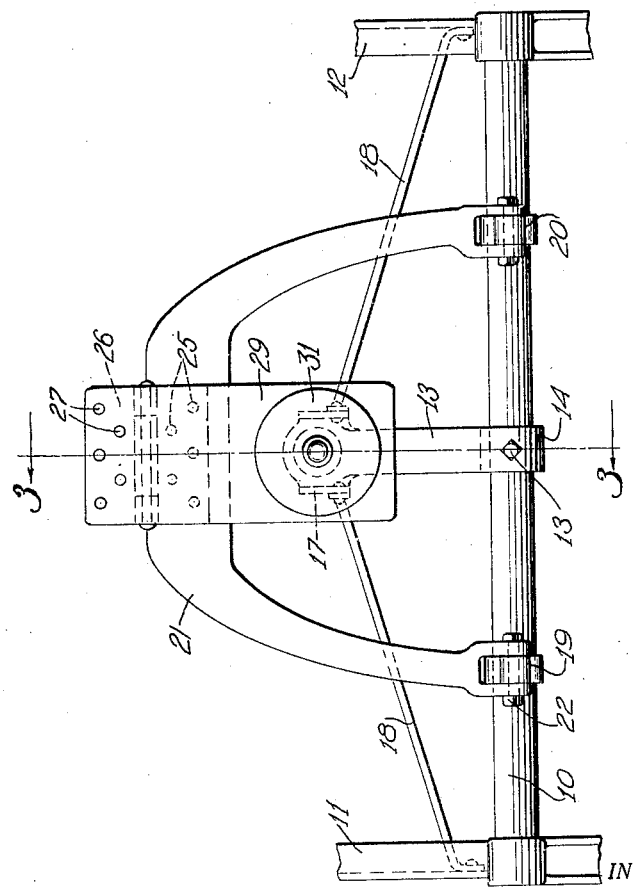
INVENTOR.
Ernest Freivogel
BY
Chamberlain & Newman
ATTORNEYS.

Patented Nov. 15, 1927.

1,649,679

UNITED STATES PATENT OFFICE.

ERNEST FREIVOGEL, OF RIDGEFIELD, CONNECTICUT, ASSIGNOR OF ONE-HALF TO RICHARD A. JACKSON, OF RIDGEFIELD, CONNECTICUT.

COMBINED TIRE RACK AND WORKBENCH.

Application filed January 7, 1927. Serial No. 159,557.

The present invention relates to a combined tire-rack and work-bench normally adapted to constitute a rear tire-rack and further adapted, on occasion, to be unfolded to provide a work-bench or table for putting tires on or taking them off of the rims, the present embodiment being particularly adapted for solid demountable rims.

An object of the invention is to provide a device of this character which will form a substantial part of the automobile structure; and when in normal use with the tire mounted thereon, will have the appearance of an ordinary tire-rack.

A further object is to provide a rack which will permit of the convenient mounting and removal of tires and wheels thereon, and which may be readily extended to form the work-bench or table when it is desired to remove or mount a tire on the rim.

In the use of a disc, or wire wheels, and demountable wood wheels, the wheel, itself, is adapted to be mounted directly upon the tire-rack; and in the use of the rack as a work-bench, constitutes a table for supporting the rim during removal and mounting of a tire thereon. With demountable rims however, it is necessary to provide a support upon the tire-rack for the rim, and which will also constitute a table while the rack is being used as a work-bench; and to this end, it is proposed to provide a support adapted for holding the rim upon the rack, and also adapted, when the device is used as a work-bench, to support the rim in elevated horizontal relation to the table either in position for mounting a tire thereon, or in its reverse position for removing the tire therefrom.

Another object of the invention is to provide such a device having different diameter portions for supporting the rim, either obversely or reversely, in a manner to hold it in rigid position by its own weight.

A further object is to provide improved retaining means for retaining and locking the tire upon the rack, such retaining means also adapted, in the use of the device as a work-bench, to constitute a support for the device.

With the above and other objects in view, an embodiment of the invention is shown in the accompanying drawings, and this embodiment will be hereinafter more fully described with reference thereto, and the invention will be finally pointed out in the claims.

In the drawings:

Fig. 2 is a view in elevation of the device.

Fig. 3 is a vertical sectional view taken along the line 3—3 of Fig. 2.

Similar reference characters indicate corresponding parts throughout the several figures of the drawings.

Figure 1:
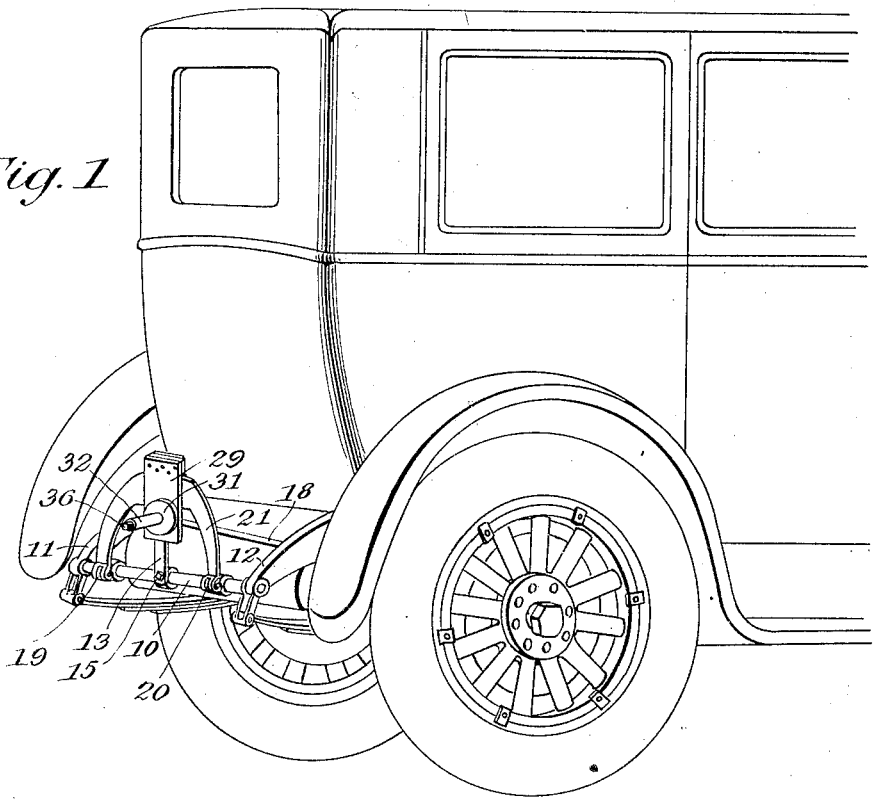
Fig. 1 is a perspective view of the rear of an automobile, showing a combined tire-rack and work-bench, according to the present embodiment of the invention, mounted thereon and in position to constitute a tire-rack.

Referring to the drawings, and more particularly to Figs. 2 and 3 thereof, the device is mounted at the rear of the automobile upon the cross-frame member 10, usually provided between the rearwardly projecting ends of the side frame members shown in the present illustration as 11 and 12. Centrally of the cross-frame member 10 there is provided an up-right support 13 bent about said member, as at 14, and rigidly secured thereto by means of a bolt 15. At the upper end of this member there is provided an aperture 16 in line with the axis of the mounted tire, as will hereinafter more fully appear; and at each side of said aperture there are formed rearwardly-bent lugs or ears 17 connected by tie-rods 18 to the side frame members 11 and 12 at each side, the rods serving with the rigid support 13 to provide a substantial mounting for the device in its use as a tire-rack. At each side of the support 13, substantially midway between said support and the ends of the member 10, hinged supports 19 and 20 are rigidly secured to said member, the supports being of any suitable construction that may be rigidly connected to the member 10 and providing forwardly-projecting hinge forming portions.

The hinged rack member 21, in the form of an inverted U, is hingedly mounted upon the supports 19 and 20 by means of hinge-bolts 22 and 23. This member may be of any suitable construction, such as sheet metal, cast iron, or the like, and at its upper transverse portion and at its rear side, one member 24 of a hinge is secured thereto by means of rivets 25 or otherwise, the other member 26 of the hinge normally extending above the upper edge of the member 21 and having secured thereto, by means of rivets 27, a spacer-plate 28 normally resting upon the upper edge of the member 21, as shown in Fig. 3, and of substantially the same metal thickness, and the upper end of an extension support 29 normally extending downwardly across the face of the transverse portion of the member 21, and in front of the upper end of the rigid support 13, where it is provided with an aperture 30 in axial alignment with the aperture 16 of said support 13.

It will be noted that the hinge line of the hinge 24—26 is in the plane of the upper edge of the member 21, so that said extension support 29 is adapted to have its upper end folded back upon the rearward side of the member 21, in which position the support 29 constitutes a projection or extension of the member 21. In surrounding relation to the aperture 30 in the member 29, there is provided an enlarged circular base portion 31; and within said aperture there is secured a central post 32 having a flange 33 at one end engaging the underside of said extension support 29 and a threaded stud 34 adapted to be inserted through the aperture 16 of the rigid support 13, where it is engaged by an elongated nut 35 to thereby secure the support 29 and the central post 32 in rigid relation to the support 13. At the forward end of the central post 32 there is provided a threaded extension or stud 36 for the purpose of securing the tire retaining means hereinafter more fully referred to.

Figure 4:
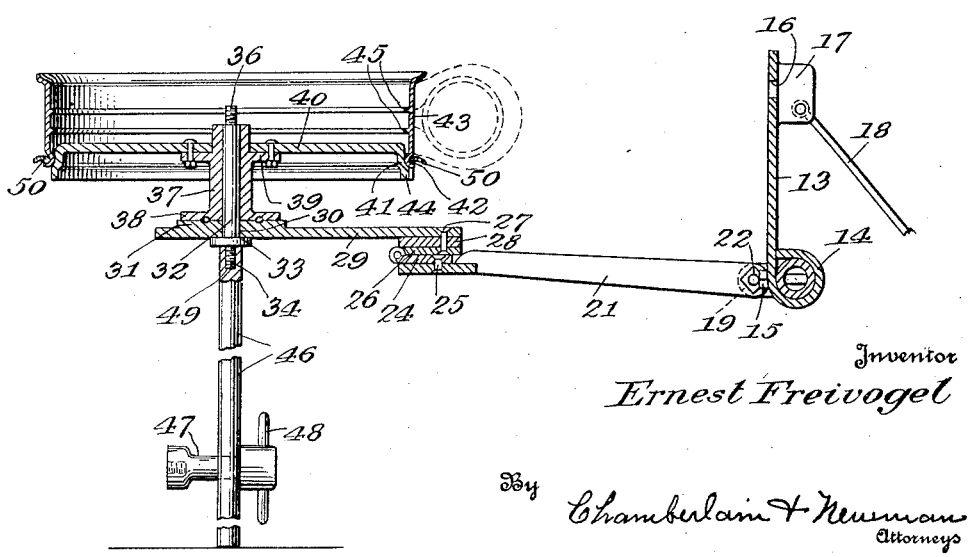
Fig. 4 is a view, partly in section and partly in elevation, showing the device in its extended position for use as a work-bench or table.

In this relation, the device constitutes a tire-rack; and it will be understood that demountable wheels, such as wire wheels, disc wheels, or the demountable artillery type of wood wheel, may be directly engaged upon the central post 32, and in such engaged relation may also constitute a supporting table for the mounting or removal of a tire in the extended relation of the device as shown in Fig. 4.

For the purpose of mounting a demountable rim, however, a special type of support or table is provided, and which consists of a hub 37 rotatably mounted upon the central post 32, provided with a base flange 38 that may turn on the portion 31 of the support 29, and provided in spaced relation to its outer end with a flange 39 upon which there is secured a circular plate or table 40. This plate is provided at its periphery with a flange including a portion 41 of a diameter adapted to receive and support the grooved ring-receiving portion 42 at the forward side of the tire rim 43, and a larger diameter stepped portion 44 of a diameter adapted to receive and rigidly support the inner surface of said rim 43 near the rearward edge of the rim, this surface, as is usual with solid demountable rims, provided with circumferential ribs 45, which when the rim is in the reverse position from that shown in Fig. 4 abut the shoulder between the flange portions 41 and 44 and thereby position the rim.

As shown in Fig. 3, the tire rim is supported upon the table 40 in substantially the same manner as shown in Fig. 4, except that here the rim is secured in place by means of a bar 46 provided centrally with a nut portion 47, which is screwed upon the threaded stud 36 of the central post 32, this nut being rotatable within and adapted to be turned by a hand-grip portion 48, so that the bar may be positioned and then secured by turning the nut by hand without changing the position of the bar. The bar is further provided at one end with a threaded bore 49 of a diameter adapted to be engaged upon the threaded stud 34 so as to constitute a support for the device when used as a work-bench, as will presently more fully appear.

In order to remove the spare tire from the rack, for mounting upon a wheel, it is only necessary to remove the bar 46 by disengaging the nut 47 from the central post 32, the tire rim being then readily removed from the plate 40. When it is desired to remove a tire from the rim or place another one thereon, in repairing punctures and the like, the rack is adapted to be extended and used as a work-bench, as clearly shown in Fig. 4. For this purpose, the bar 46 is removed by disengaging the nut 47 from the central post 32, and the rack is released from the rigid support 13 by disengaging the elongated nut 35 at the rear, disengagement of this nut permitting the member 21 to be swung outwardly into a substantially horizontal position. At the same time the extension support 29 is swung outwardly with relation to the end of the member 21, the horizontal position of the said support, with relation to the member 21, being maintained by abutment of the hinged portions 26 and 24, and in this position the bar 46 is screwed upon the threaded stud 34 and constitutes a supporting leg for the device which now may be used as a work-bench.

In this position, and with the tire rim mounted upon the plate 40 as shown in Fig. 4, the retaining ring 50 engaged in the groove 42 may be snapped out, and the tire may be readily slipped off of the rim without the necessity of employing prying tools. When replacing the repaired tire or a new tire upon the rim, the latter is placed upon the plate or table 40 in its normal position, that is, with the interior of the rim engaging the flange 44 and with the grooved edge 42 upwardly. The tire will readily move into place against the rearward flange of the rim and the retaining ring may thereupon be snapped into the groove 42 in the usual manner.

I have illustrated a preferred and satisfactory embodiment of the invention, but it is obvious that changes may be made therein within the spirit and scope thereof as defined in the appended claims.

Having thus described my invention, what I claim and desire to secure by Letters Patent is:

1. A convertible tire-rack and work-bench, comprising supporting means adapted to be rigidly secured to a portion of an automobile, a hinged member movable between a substantially vertical position and a substantially horizontal position, means for rigidly securing said member with respect to said supporting means in said substantially vertical position, tire rim supporting means carried by said hinged member, means for securing a tire rim to said supporting means, and said securing means adapted to form a support for said rim supporting means in the horizontal position of said hinged member.

2. A convertible tire-rack and work-bench, comprising supporting means adapted to be rigidly secured to a portion of an automobile, a hinged member movable between a substantially vertical position and a substantially horizontal position, means for rigidly securing said member with respect to said supporting means in substantially vertical position, and tire rim supporting means hingedly secured to said hinged member adapted to be moved between a superimposed position with relation to said member and an extended position.

3. A convertible tire-rack and work-bench, comprising supporting means adapted to be rigidly secured to a portion of an automobile, a hinged member movable between a substantially vertical position and a substantially horizontal position, tire rim supporting means for removably securing said hinged member with respect to said support to rigidly secure the vertical relation of said hinged member, and means adapted to be secured to said tire rim supporting means in the horizontal position of said hinged member and constituting an upright support.

4. A convertible tire-rack and work-bench, comprising supporting means adapted to be rigidly secured to a portion of an automobile, a hinged member movable between a substantially vertical position and substantially horizontal position, an extension member hingedly secured to said hinged member at one end and provided at its other end with a central post, said extension member being movable between a position in superimposed relation to said hinged member and a position in extended relation thereto, means for securing said hinged member in said superimposed relation to said support, and means adapted to be engaged with said extension member in said extended relation to constitute an upright support for the hinged member in its horizontal relation.

5. A convertible tire-rack and work-bench, comprising supporting means adapted to be rigidly secured to a portion of an automobile, a tire rim supporting means hingedly secured to said rigid supporting means, means adapted to be secured to said tire rim supporting means constituting an upright post, said tire rim supporting means including a disc having annular seats thereon of different diameters.

6. A convertible tire-rack and work-bench, comprising supporting means adapted to be rigidly secured to a portion of an automobile, a hinged member movable between a substantially vertical position and a substantially horizontal position, means for rigidly securing said member with respect to said supporting means in said substantially vertical position, and tire rim supporting means carried by said hinged member and comprising a disc including an annular flange having two diameters.

7. A convertible tire-rack and work-bench, comprising supporting means adapted to be rigidly secured to a portion of an automobile, a hinged member movable between a substantially vertical position and a substantially horizontal position, means for rigidly securing said member with respect to said supporting means in said substantially vertical position, and tire rim supporting means carried by said hinged member, including a member having peripheral flanged portions of two diameters, one of said diameters adapted for engagement with the reduced diameter edge of a tire rim, and the other diameter flanged portion adapted for engagement with the inner periphery of the rim in reverse relation to the engagement with the reduced diameter flanged portion.

8. A convertible tire-rack and work-bench, comprising supporting means adapted to be rigidly secured to a portion of an automobile, a hinged member movable between a substantially vertical position and a substantially horizontal position, an extension member hingedly secured to said hinged member at one end, a center post provided at its other end, a threaded stud at the rearward end of said center post adapted to be engaged with said supporting means, securing means adapted to be engaged with said threaded stud to rigidly secure said center post in respect to said support, a rim retaining bar adapted to be removably engaged with the forward end of said center post and provided at one end with a threaded portion adapted for engagement with said threaded stud, whereby in the extended horizontal position of said hinged member and hinged extension said rim retaining bar is adapted for engagement with said central post at its rearward end to constitute an upright support.

9. A convertible tire-rack and work-bench, comprising a table having annular supporting means of two diameters, one adapted for engagement with the smaller flange of a tire rim and the other for engagement with the larger periphery of the rim in reverse relation to the engagement with the smaller annular portion, said bench being rotatably mounted upon a support elevating from the ground, and so constructed as to hold a tire rim by its own weight, while a tire is being put on or taken off the rim.

10. A convertible tire-rack and work-bench, comprising a hinged member movable between a substantially vertical position and a substantially horizontal position, tire rim supporting means hingedly secured to said hinged member adapted to be moved between superimposed position with relation to said member and an extended position, means for securing a tire rim on said rim supporting means, and said securing means adapted to be a support for said rim supporting means in the horizontal position of said hinged member.

Signed at Ridgefield in the county of Fairfield and State of Connecticut this 5th day of Jany., A. D. 1927.

ERNEST FREIVOGEL.